(12) United States Patent
Tonouchi et al.

(10) Patent No.: US 9,384,304 B2
(45) Date of Patent: Jul. 5, 2016

(54) DOCUMENT SEARCH APPARATUS, DOCUMENT SEARCH METHOD, AND PROGRAM PRODUCT

(71) Applicant: KABUSHIKI KAISHA TOSHIBA, Minato-ku, Tokyo (JP)

(72) Inventors: Yojiro Tonouchi, Inagi (JP); Yasunobu Yamauchi, Yokohama (JP); Kazunori Imoto, Kawasaki (JP); Tomoyuki Shibata, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 196 days.

(21) Appl. No.: 13/903,511

(22) Filed: May 28, 2013

(65) Prior Publication Data

US 2013/0318120 A1 Nov. 28, 2013

(30) Foreign Application Priority Data

May 28, 2012 (JP) ................................ 2012-121306

(51) Int. Cl.
*G06F 17/00* (2006.01)
*G06F 17/30* (2006.01)

(52) U.S. Cl.
CPC .... *G06F 17/30976* (2013.01); *G06F 17/30637* (2013.01)

(58) Field of Classification Search
CPC .......... G06F 17/3053; G06F 17/30867; G06F 17/30554; G06F 17/30595
USPC .......................................................... 707/727
See application file for complete search history.

(56) References Cited

U.S. PATENT DOCUMENTS

| 6,130,962 | A | 10/2000 | Sakurai |
| 7,929,770 | B2 | 4/2011 | Arai |
| 2002/0071607 | A1* | 6/2002 | Kawamura ............. G06K 9/222 382/187 |
| 2005/0055628 | A1 | 3/2005 | Chen et al. |
| 2005/0154707 | A1* | 7/2005 | Napper ............. G06F 17/30011 |
| 2006/0112142 | A1* | 5/2006 | Sako et al. ................. 707/104.1 |
| 2011/0153633 | A1 | 6/2011 | Napper et al. |
| 2012/0066578 | A1* | 3/2012 | Robin ................. G06F 3/03545 715/212 |

FOREIGN PATENT DOCUMENTS

| CN | 1625741 | A | 6/2005 |
| CN | 1637741 | A | 7/2005 |
| JP | 63-228874 | A | 9/1988 |

(Continued)

OTHER PUBLICATIONS

First Office Action mailed by Japan Patent Office on May 13, 2014 in the corresponding Japanese Patent Application 2012-121306—6 pages.

(Continued)

*Primary Examiner* — Truong Vo
(74) *Attorney, Agent, or Firm* — Knobbe, Martens, Olson & Bear, LLP

(57) ABSTRACT

According to one embodiment, a document search apparatus includes an acquirer, determiner, searcher, and display. The acquirer acquires data on a handwriting including coordinate data. The determiner determines a shape of the handwriting based on the coordinate data to determine a type of a query. The searcher searches the document according to a search method corresponding to the type of the query. The display that displays the document by a display method corresponding to the type of the query.

11 Claims, 9 Drawing Sheets

(56) References Cited

FOREIGN PATENT DOCUMENTS

| | | |
|---|---|---|
| JP | H11-053402 | 2/1999 |
| JP | 2006-031492 A | 2/2006 |
| JP | 2007-317022 | 12/2007 |

OTHER PUBLICATIONS

Background Art Information, Toshiba, Aug. 20, 2012.
Cheng Cheng, et al., "A Discriminative Model for On-line Handwritten Japanese Text Retrieval," 2011 International Conference on Document Analysis and Recognition, IEEE, pp. 1285-1288.

Pasitthideth Luangvilay, "An On-line Handwritten Text Search Method based on Directional Feature Matching," 2011 International Conference on Document Analysis and Recognition, IEEE, pp. 683-686.

First Office Action dated Nov. 10, 2015 issued by Japan Patent Office in the corresponding Japanes Patent Application No. 2015-014601—4 pages.

Office Action dated Dec. 28, 2015 in corresponding Chinese Application No. 201210362464.8, 13 pgs.

\* cited by examiner

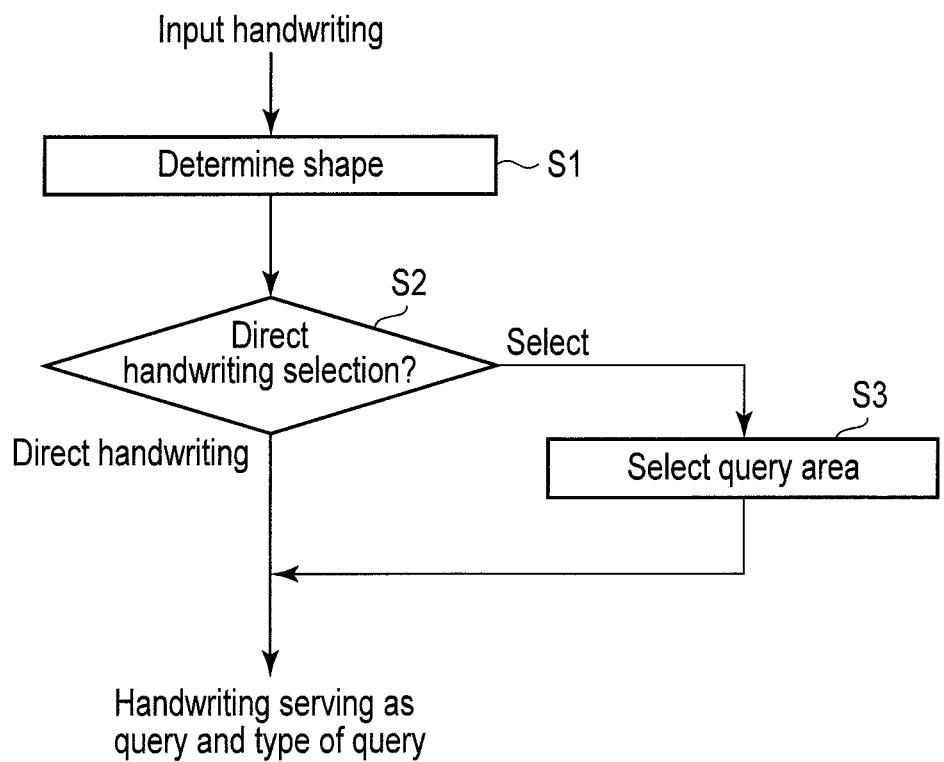
F I G. 5

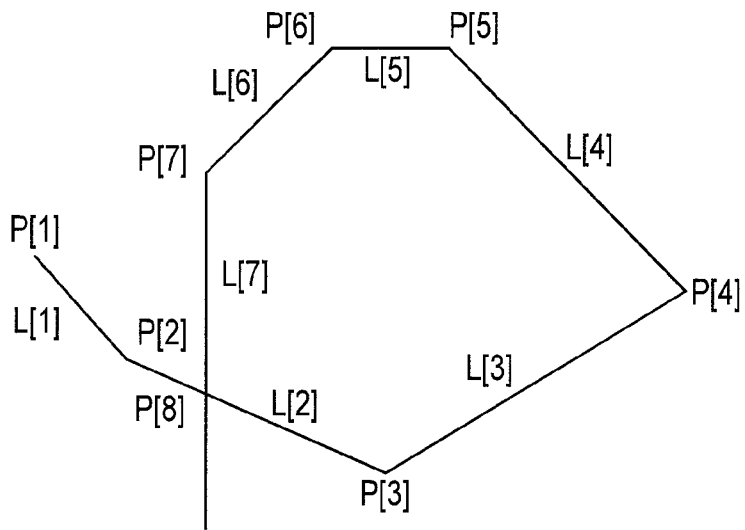
F I G. 7
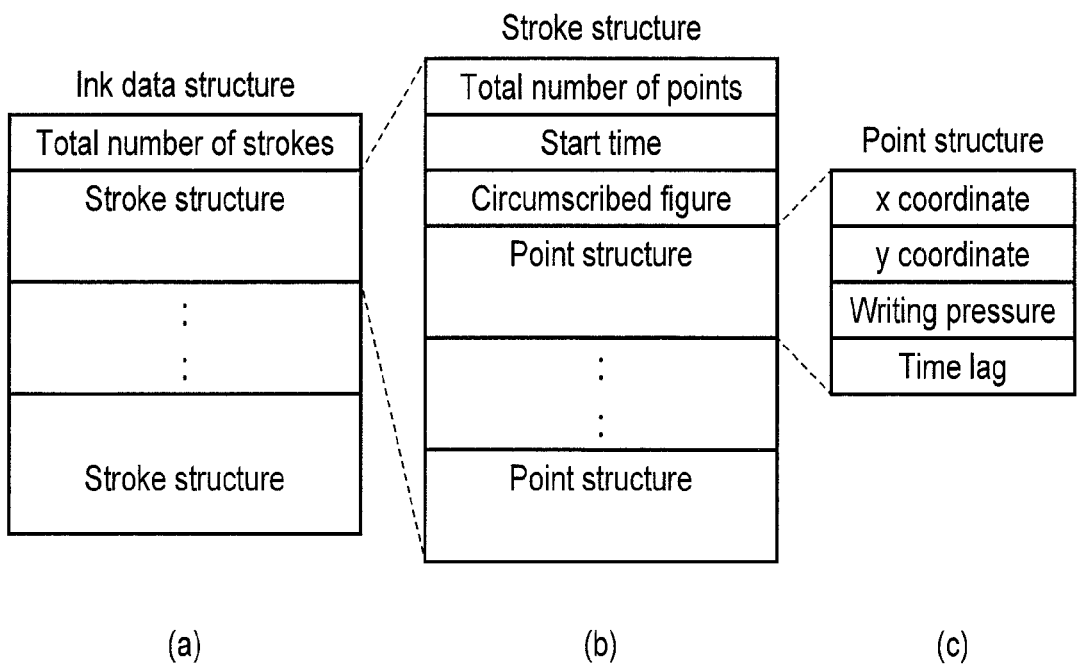
F I G. 8

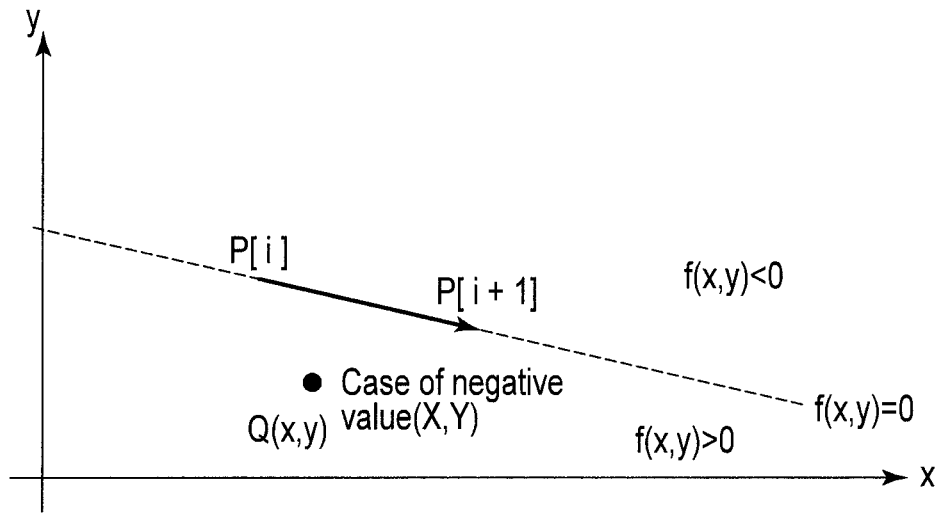
F I G. 14
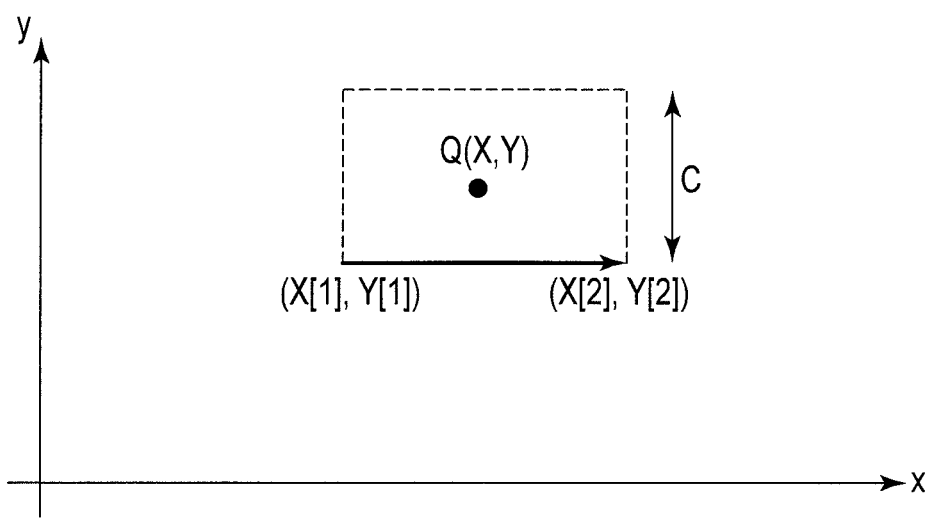
F I G. 15

DOCUMENT SEARCH APPARATUS, DOCUMENT SEARCH METHOD, AND PROGRAM PRODUCT

CROSS-REFERENCE TO RELATED APPLICATIONS

This application is based upon and claims the benefit of priority from Japanese Patent Application No. 2012-121306, filed May 28, 2012, the entire contents of which are incorporated herein by reference.

FIELD

Embodiments described herein relate generally to a document search apparatus, a document search method, and a program.

BACKGROUND

Document search apparatuses are known which searches a database for a handwritten text that is similar to or matches a handwritten query input or specified by a user.

BRIEF DESCRIPTION OF THE DRAWINGS

FIG. 5 is a flowchart showing a process for query determination;

FIG. 7 is a flowchart showing a process for closed loop determination;

FIG. 8 is a diagram showing an ink data structure;

FIG. 14 is a diagram illustrating a process of determining whether or not a handwriting is contained inside a closed loop; and FIG. 15 is a diagram illustrating a process of determining whether or not a handwriting is present near and above a horizontal line.

DETAILED DESCRIPTION

In general, according to one embodiment, a document search apparatus includes an acquirer, determiner, searcher, and display. The acquirer acquires data on a handwriting including coordinate data. The determiner determines a shape of the handwriting based on the coordinate data to determine a type of a query. The searcher searches the document according to a search method corresponding to the type of the query. The display that displays the document by a display method corresponding to the type of the query.

An embodiment will be described below with reference to the drawings.

The present embodiment relates to a search system that is used if a search target and a query are handwritten data. That is, the present system is mainly intended for such a language-independent search system as uses a "handwritten document" as a search target and as uses, for a search, a query that uses handwritten characters or the like (hereinafter referred to as a "handwritten query"). The handwritten query is not limited to characters but includes a user's drawing such as a mark or a line.

However, the search target may be a text document. In this case, a handwritten query is converted into a text query for a search. Furthermore, the search target may be a handwritten document, and the query for use for a search may be a text query. In this case, the text query is converted into a handwritten query for a search. In any of these examples of systems, according to the embodiment described below, the type of the handwritten query is determined, a search is carried out by a search method corresponding to the type of the handwritten query, and a search result is displayed by the corresponding appropriate display method.

According to the present embodiment, the handwritten query is classified into, for example, a "string", a "one-stroke mark", an "underline", and an "enclosure". A search target in a handwritten text which is similar to or matches a handwritten query varies depending on the type of the handwritten query. For example, if the type of the handwritten query is a string, the string itself is a search target. For a one-stroke mark, the search is not limited to the one-stroke mark itself. For the one-stroke mark, the search target is strings preceding and succeeding the one-stroke mark. If the type of the handwritten query is an underline or an enclosure, an underlined string or a string enclosed by an enclosure is to be searched for.

Possible types of queries are not limited to those described above. Those skilled in the art can modify the embodiment by expanding the range of handwritten queries or conversely reducing the types of handwritten queries based on the present disclosure.

Figure 1:
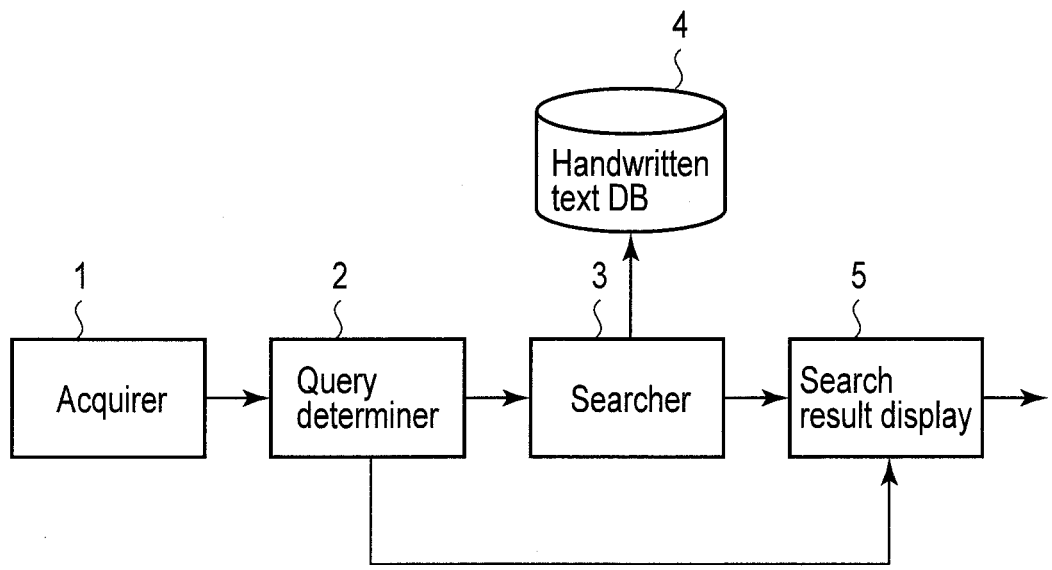
FIG. 1 is a block diagram of a document search apparatus according to an embodiment.

As shown in FIG. 1, a document search apparatus according to the embodiment comprises an acquirer 1 that acquires handwriting data, a query determiner 2 that determines the type of a query, a searcher 3 that searches for a text, a handwritten text database (DB) 4, and a search result display 5 that displays a search result.

The acquirer 1 acquires handwriting data including coordinate data.

The handwriting data acquired by the acquirer 1 includes time-series coordinate data for each stroke and is expressed, for example, as follows.

Stroke 1: $(x(1,1), y(1,1)), (x(1,2), y(1,2)), \ldots, (x(1,N(1)), y(1,N(1)))$

Stroke 2: $(x(2,1), y(2,1)), (x(2,2), y(2,2)), \ldots, (x(2,N(2)), y(2,N(2)))$

Where, "$N(i)$" denotes the number of points for sampling of a stroke i.

Such handwriting data as described above is also provided for handwritten documents that are stored in the handwritten document DB 4.

Figure 2:
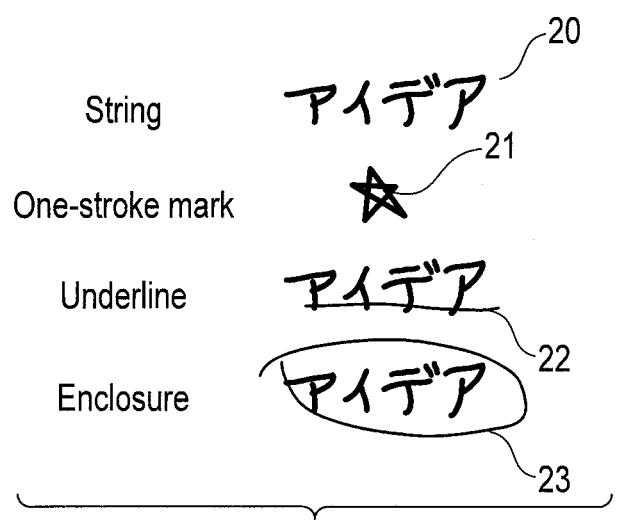
FIG. 2 is a diagram showing types of queries.

FIG. 2 shows several types of queries by way of example. As described above, the type of a query is one of a string, a one-stroke mark, an underline, and an enclosure. A query is classified into one of these types based on the shape of handwriting. In FIG. 2, a string query is shown by reference numeral 20. In this case, for example, the string "アイデア" is handwritten (or selected from a handwritten document). The meaning of "アイデア" is "idea" in English, so hereinafter "アイデア" is called "idea". Of course, the content of the strings is not limited to the string "idea" but is optional. The term "string" as used herein means that the shape of the handwriting is a character string and does not mean a text comprising a series of character codes. A one-stroke mark query is shown by reference numeral 21. In this case, for example, a star mark is handwritten (or selected from a handwritten document). For example, the one-stroke mark is added to a portion of the text which is noted by a user more highly than the other portions, for distinction. Furthermore, in a handwritten document, the one-stroke mark is written at the head of each line for itemization. An underline query is shown by reference numeral 22. In a handwritten document, the underline is often provided in order to emphasize the string. An enclosure query is shown by reference numeral 23. In a handwritten document, the enclosure is often provided in order to emphasize the string like the underline or to distinguish the particular string from the other strings.

The query determiner 2 determines the shape of handwriting using handwriting coordinate data acquired by the acquirer 1 to determine the type of the query.

A method for inputting a query will be described with reference to FIG. 3. Examples of the method for inputting a query include (i) direct handwriting, (ii) direct handwriting selection, and (iii) indirect handwriting selection.

(i) The direct handwriting is a method in which the user inputs a handwriting corresponding to a query in a handwriting manner using an input device (stylus pen or the like). In FIG. 3, an example 30 of a directly handwritten query is the string "idea". An example 31 of the query is a star-shaped one-stroke mark. An example 32 of the query is an underline. An example 33 of the query is an enclosure. In brief, a search input area is presented, and the user inputs the query directly to the search input area.

(ii) The direct handwriting selection is a method of directly selecting a handwriting to be used as a query from a displayed handwritten text instead of inputting the query itself in a handwriting manner. For example, the user operates an input device so as to draw a diagonal line 34 to directly select a handwriting 35 enclosed by a rectangle and specified by the diagonal line 34 (in this example, "idea"). Alternatively, the user directly selects a handwriting 36 using the input device or by finger tapping.

(iii) The indirect handwriting selection is a method of indirectly selecting a handwriting to be used as a query from a displayed handwritten. For example, the user operates the input device so as to draw an underline 37 to indirectly select a handwriting 38 (in this case, "idea") located above and adjacent to the underline. Alternatively, the user operates the input device so as to draw an enclosure 39 to indirectly select a handwriting 40 (in this case, "idea") inside the enclosure 39.

In the (iii) indirect handwriting selection, one example has been illustrated wherein the user operates the input device so as to draw the underline 37 to input a query. However, the query determiner 2 may determine the direction of handwriting of the underline 37 and vary the processing of the underline 37 depending on the result of the determination. The direction of the handwriting can be determined based on the magnitude of the above-described coordinate values in the time series of handwriting data. For example, if the underline 37 is drawn from the left to right of the sheet of FIG. 4 as shown in FIG. 4(*a*), this is not treated as a query input but as a normal handwriting of an underline (a handwriting that is not a query). On the other hand, if the underline 37 is drawn from the right to left of the sheet of FIG. 4 as shown in FIG. 4(*b*), this is treated as a query input. Specifically, as described with reference to FIG. 3, a handwriting 42 located above and adjacent to the underline 37 (in this case, "idea") is indirectly selected. The direction of handwriting may also be determined for other handwritings such as an enclosure. For example, an enclosure drawn clockwise may be treated as a normal handwriting so that an enclosure drawn counterclockwise can be determined to indicate indirect handwriting selection as described with reference to FIG. 3. When the processing is varied depending on the determined direction of handwriting, a user interface for handwriting search can be appropriately provided.

A specific process for determining the type of a query will be described with reference to a flowchart in FIG. 5.

In step S1, the shape of an input handwriting is determined. Using the coordinate data included in the stroke data of a query input acquired by the acquirer 1, the query determiner 2 determines the shape of the handwriting to determine the type of the query to be one of a string, a one-stroke mark, an underline, and an enclosure.

Figure 6:
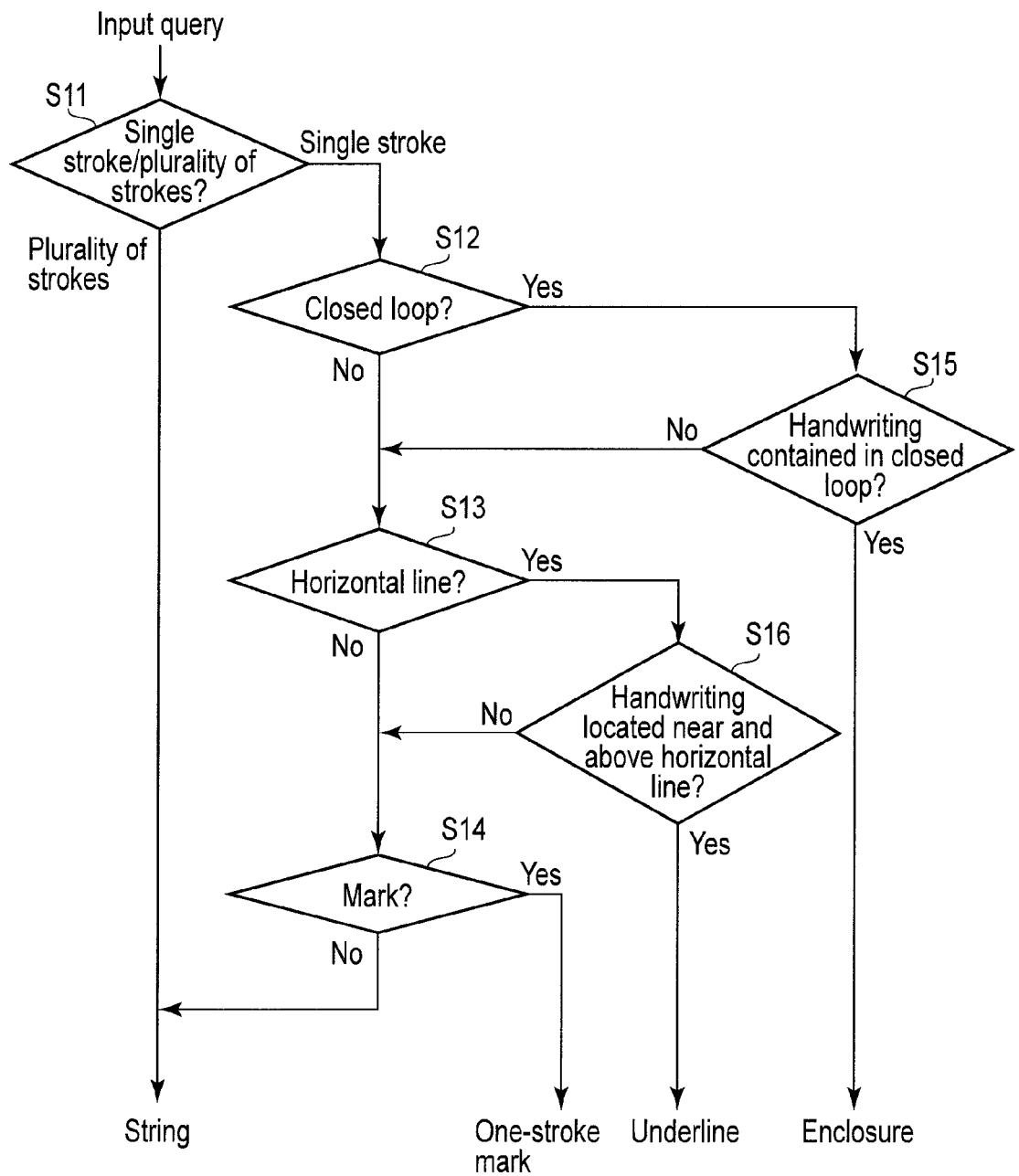
FIG. 6 is a flowchart showing a process for shape determination.

FIG. 6 is a flowchart showing a process for shape determination. The process for shape determination is carried out based on coordinate data acquired by the acquirer 1.

In step S11 in FIG. 6, the apparatus determines whether an input query (input handwriting) is a single stroke or a plurality of strokes. If the input query is a "single stroke", then in step S12, the apparatus determines whether or not the handwriting of the stroke forms a closed loop. A process for closed loop determination will be described with reference to FIG. 7. The apparatus determines whether a polygonal line $P_1, P_2, \ldots, P_{n-1}, P_n$ forms a closed curve. Each segment of the polygonal line is expressed by $L_i = P_i P_i + 1$. In this case, the apparatus checks whether Li and Lj (i<j) intersect, and if the segments intersect, determines that P[i], ... P[j+1] form a closed curve. For example, in an example in FIG. 7, segments L[2] and L[7] intersect and P[2], ... P[8] form a closed curve. Moreover, the distance from the start point P[0] to end point P[N] of the stroke is calculated. If the calculated distance is shorter than the overall length of the stroke, the apparatus determines the handwriting to be a closed loop. Upon determining in step S12 in FIG. 6 that the handwriting is a closed loop, the apparatus determines in step S15 whether or not the handwriting is contained inside the closed loop.

A process of determining whether or not the handwriting is contained inside the closed loop will be described with reference to FIG. 14. When determination target points Q[1], Q[2], . . . , Q[M] of the handwriting are all inside the closed loop curve, the apparatus determines that the handwriting is contained in the closed loop. Whether a point Q is contained in the closed loop can be determined as follows. The closed loop curve is defined as P[1] (X[1], Y[1]), P[2] (X[2], Y[2]), . . . , P[N−1] (X[N−1], Y(N−1))). A determination target point is denoted by Q(X, Y).

(1) A straight line f[i] (x, y)=0 which joins two points P[i] and P[i+1] together is calculated based on f(x, y)=(Y[i+1]−Y[i]*(x−X[i])−(X[i+1]−X[i])*(y−Y[i])=0. However, for i=N, a straight line f[N](x, y)=0 which joins two points P[N] and P[0] is used.

(2) The apparatus determines to which side Q(X, Y) is located with respect to the traveling direction of the straight line. Thus, f[i](X, Y) is calculated. If the resultant value is positive, Q(X,Y) is located to the right of the traveling direction. If the resultant value is negative, Q(X,Y) is located to the left of the traveling direction.

(3) The processing in (1) and (2) is repeated for all the values of i. If Q(X, Y) takes the same sign in all the straight lines f[i](X, Y), Q is determined to be inside the closed loop.

If in step S15, the query is determined to be a closed loop, the type of the query is determined to be an enclosure.

If in step S12 or step S15, the query fails to be determined to be a closed loop, the apparatus determines whether the one-stroke handwriting is a horizontal line. For example, a well-known linear regression problem is solved to fit a straight line to fit the polygonal line. When a regression error determined by this process is equal to or smaller than a threshold, the handwriting is determined to be a straight line. If the query can be determined to be a straight line, when the absolute value of inclination of the straight line is equal to or smaller than a given value, the straight line is determined to be horizontal. If in step S13, the query is determined to be a horizontal line, the apparatus determines in step S16 whether or not the handwriting is located near and above the horizontal line.

A process of determining whether or not the handwriting is located near and above the horizontal line will be described with reference to FIG. 15. When the points Q[1], Q[2] . . . Q[M] of the determination target handwriting are all located near and above the segment, the handwriting is determined to be located near and above the segment. Whether the point Q is located near and above the segment can be determined as follows. The segment is defined as P[1] (X[1], Y[1]) and P[2] (X[2], Y[2]), but X[1]<X[2] and the determination target point is Q(X, Y). When the following four expressions are simultaneously met, the point Q can be determined to be located near and above the segment.

$$X[1]<X$$

$$X<X[2]$$

$$Y>(Y[1]+Y[2])/2$$

$$Y<(Y[1]+Y[2])/2+C$$

In these expressions, "C" denotes a preset threshold.

If in step S16, the handwriting is determined to be located near and above the horizontal line, the type of the query is finally determined to be an "underline".

If in step S13 or step S16, the straight line is not determined to be horizontal, the apparatus determines in step S14 whether the one-stroke handwriting is a mark. In this case, the similarity between the one-stroke handwriting and predetermined marks (example "○", "△", "☆", and "□") is calculated. If the similarity between the one-stroke handwriting and each mark is equal to or smaller than a given value, the handwriting is determined to be a "one-stroke mark". A specific process for calculating the similarity to a predetermined mark may be carried out using a method described in, for example, Japanese Patent No. 3537949.

If query is not determined to be a mark in step S14 in FIG. 6 and is determined to be "a plurality of strokes" in step S11, the type of the query is determined to be a "string".

Figure 3:
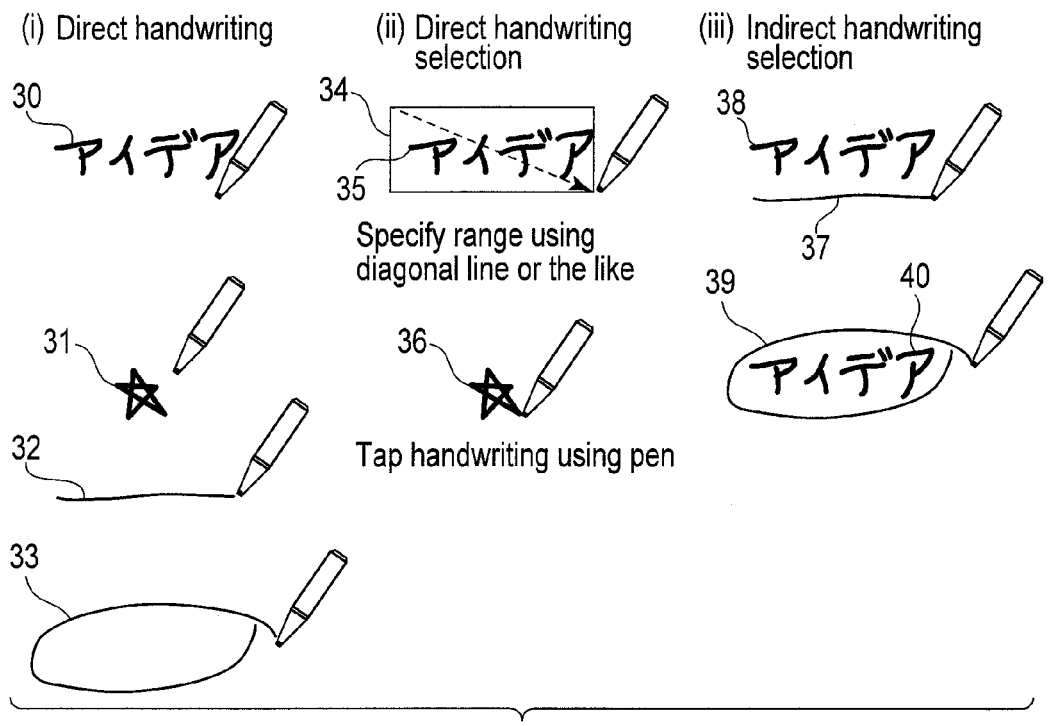
FIG. 3 is a diagram illustrating a method for inputting a query.
Figure 4:
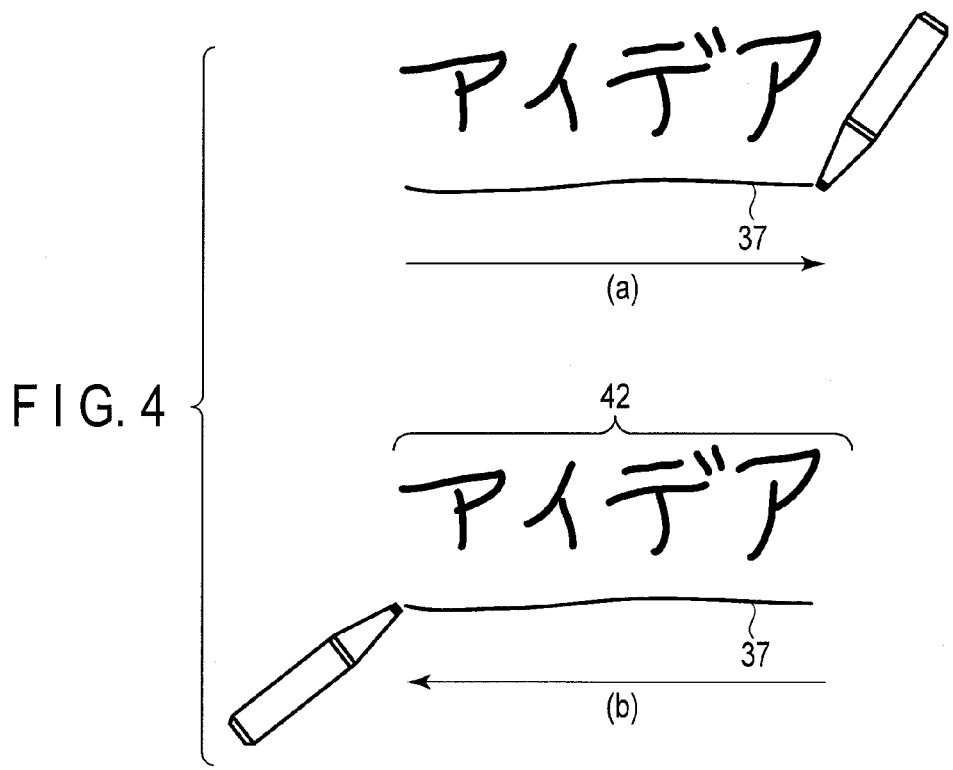
FIG. 4 is a diagram illustrating distinction of handwritings based on the directions of the handwritings.

In step S2 in FIG. 5, the apparatus determines whether the method for query input is the "direct handwriting" or the "selection" (for the method for query input, see FIG. 3). For the "direct handwriting", the input handwriting data is directly output as a query in addition to the determined type of the query. For the "selection", an area considered to be a query is selected from the displayed handwritten text to extract the handwriting data. The handwriting data is output in addition to the determined type of the query.

As described above, the determined type of the query and the handwriting data are passed from the query determiner 2 to the searcher 3 and the search result display 5.

Then, a timing for initiation of a search process will be described. The search process according to the present embodiment can carry out a search for each of the (i) direct handwriting, the (ii) direct handwriting selection, and the (iii) indirect handwriting selection. For the (i) direct handwriting, after a handwriting is input, a search process is carried out when a search button is selected using a pen. This is similar to a series of operations for a text search in which the search button is clicked via a mouse after a text is input. If the search input area is presented, the input handwriting may be set to be a handwriting to be searched for during a pen-up event or if no input has been provided for a predetermined time.

For the (ii) direct handwriting selection, the following is carried out when a query handwriting is determined to be selected.

(1) During a pen-up event, a search process is carried out (mostly in a search mode), or (2) during a pen-up event, a context menu or a dialog is displayed to ask the user whether to carry out a search.

(iii) For the indirect handwriting selection, an operation similar to that in (ii) is performed when a query handwriting is determined to be selected.

The searcher 3 searches the handwritten document DB 4 for a text in accordance with a search method corresponding to the type of the query determined by the query determiner 2, to obtain a search result. Specifically, the search is carried out in accordance with the search method corresponding to the type of the query as follows.

(a) String: the handwritten document DB 4 is searched for a handwriting that is similar to or matches the string query.

(b) One-stroke mark: the handwritten document DB 4 is searched for a handwriting that is similar to or matches the one-stroke query. However, if the one-stroke mark is selected from the head of a line, then for example, the search target may be limited to the head of a line. Similarly, the priority of a mark present at the head of a line may be increased.

(c) Underline: the handwritten document DB 4 is searched for a horizontal line near and above which the handwriting is located.

(d) Enclosure: the handwritten document DB 4 is search for a closed curve inside which a handwriting is contained.

Here, a specific example of a process of searching the handwritten document DB 4 for a handwriting that is similar to or matches a string query will be described. The searcher 3 searches for a stroke sequence (a series of strokes) which is similar to a stroke sequence of a query, in a plurality of stroke sequences. The searcher 3 may perform the search by means of matching of a characteristic vector. An example of a more specific structure of stroke data (handwriting data) will be described with reference to FIG. 8.

The "stroke" is a stroke of a character input in a handwriting manner and refers to a trajectory obtained after a pen or the like comes into contact with an input surface and before the pen leaves the input surface. Normally, points on the trajectory are sampled at predetermined timings (for example, at regular intervals). Thus, the stroke is expressed by a sequence of sampled points.

In an example in FIG. 8(b), the stroke structure of one stroke is expressed by a set of coordinate values (point structure) on a plane on which the pen has moved. Specifically, the stroke structure includes a sequence of the "total number of points" indicative of the number of points forming the stroke, a "start time", a "circumscribed figure", and "point structures" for the number of points corresponding to the total number of points. Here, the start time is indicative of the time when in the stroke, the pen comes into contact with the input surface and starts writing. The circumscribed figure is indicative of a circumscribed figure around the trajectory of the stroke on the text plane. A rectangle with the minimum area containing the stroke on the document plane may be used for the circumscribed figure.

The structure of a point may depend on the input device. In an example in FIG. 8(c), the structure of one point has four values, that is, coordinate values x and y at which the point has been sampled, a writing pressure, and a time lag from an initial point (for example, the above-described "start time").

The coordinates belong to a coordinate system for the document plane, and may be represented by positive values that increase from the upper left corner to the lower right corner; the value at the upper left corner is the origin.

Furthermore, if the input device cannot acquire the writing pressure or if the input device can acquire the writing pressure, which is not used during the subsequent processing, the writing pressure in FIG. 8(c) may be omitted, or data indicative of invalidity may be provided in the writing pressure data.

In examples in FIG. 8(b) and FIG. 8(c), actual data such as the coordinate values x and y may be provided in the individual point structure areas in the stroke structure. Alternatively, the data on the stroke structure may be managed separately from the data on the point structures, and link information for the corresponding point structures may be provided in the individual point structure areas in the stroke structure.

For example, DP matching (DP: Dynamic Programming) may be used as a specific example of characteristic vector matching used when a stroke sequence similar to a stroke sequence indicative of a query handwriting is searched for. The user's specified number of strokes in a stroke sequence is not necessarily the same as the user's desired number of strokes in the stroke sequence. This is because for example, some users write two strokes of the same character in one stroke or different users may write a string with the same meaning in different numbers of strokes. Normally, DP matching for strokes is a technique deals with the correspondence between one stroke and one stroke and optimally associates the two strokes with each other with expansion and contraction of each stroke accepted. Here, DP matching with the correspondence between one stroke and N strokes taken into account is used to enable matching that is robust against a variation in the number of strokes (see, for example, "Masuda, Uchida, Sakoe, Experimental optimization of DP Matching in On-line Character Recognition, the Joint Conference of Electrical and Electronics Engineers in Kyushu, H. 17. http://human.ait.kyushu-u.ac.jp/-uchida/Papers/masuda-shibu2005.pdf"

For example, a matching target stroke sequence is associated with a stroke sequence that is the user's specified query by setting each of all the strokes included in the matching target stroke sequence to be a start point, and the similarity between the stroke sequences is calculated. The similarity based on each start point is calculated, and the strokes are sorted in order of decreasing similarity. Since each of all the strokes is set to be a start point, overlapping results are obtained. Thereafter, peak detection is carried out to integrate the ranges of overlapping strokes.

Figure 9:
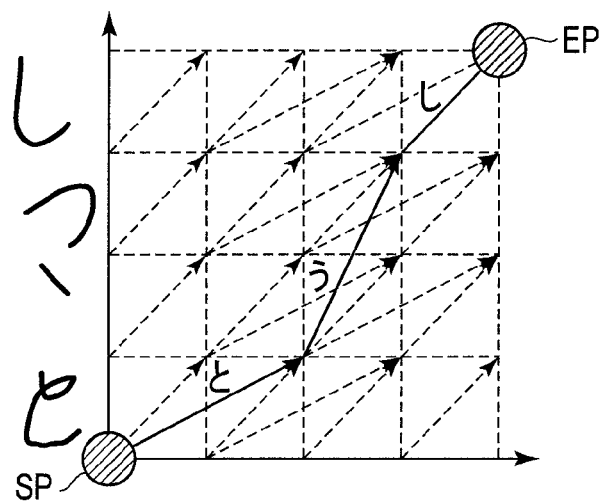
FIG. 9 is a diagram showing character recognition with DP matching.

The correspondence between multiple strokes and multiple strokes may be taken with use of the DP matching. For facilitating the understanding of this technique, a case of the application thereof to character recognition is illustrated in FIG. 9. In the case of character recognition, reference strokes indicated along the horizontal axis are used for obtaining the similarity to strokes to be recognized indicated along the vertical axis, wherein the start point SP and end point EP of the reference strokes are fixed.

Figure 10:
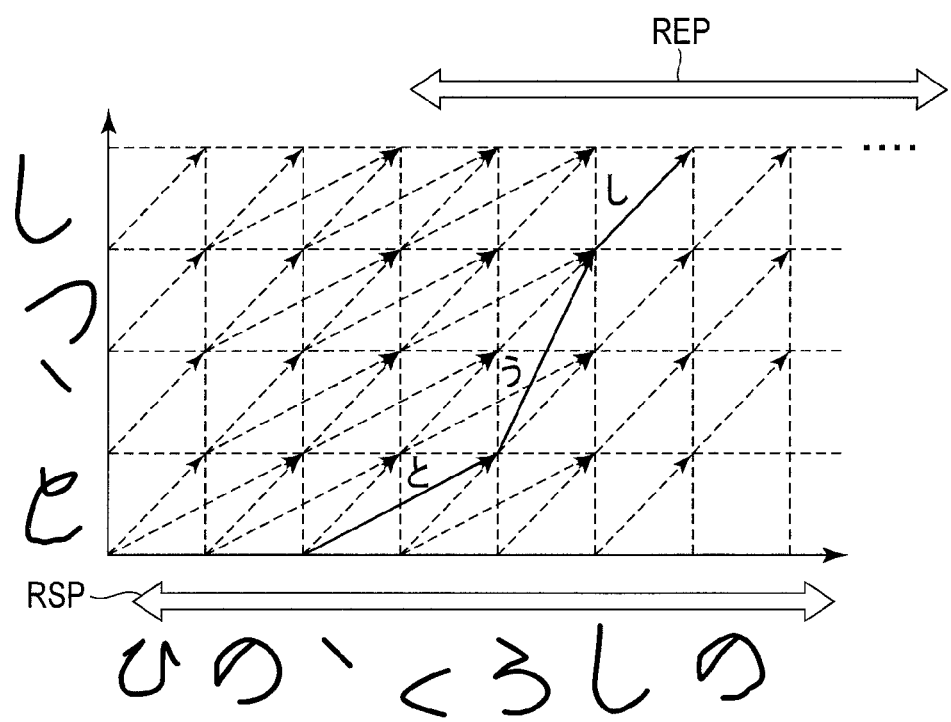
FIG. 10 is a diagram showing handwritten query search.

On the other hand, FIG. 10 shows the case where the correspondence between multiple strokes and multiple strokes by the DP matching is applied to the search for strokes according to this embodiment. In this case, strokes at least a part of which matches with strokes (indicated along the vertical axis) equivalent to a query are the target of the search. Therefore, the start point of strokes for obtaining the similarity to the query stroke column is not fixed but has a certain range RSP, and the end point thereof as well is not fixed but has a certain range ESP.

Various matching methods other than those described above are possible.

The search result display 5 displays the search result obtained by the searcher 3 by a display method corresponding to the type of the query. The following two patterns are available for displaying the search result depending on the type of the query.

(1) The retrieved handwriting and a handwriting located proximate to the retrieved handwriting are displayed.

(2) One page of handwriting including the retrieved handwriting is displayed.

However, for both patterns, a highlighting method may be varied depending on the type of the query as follows.

(a) String: A handwriting located proximate to the retrieved handwriting is also displayed. However, the retrieved handwriting itself is highlighted by changing the color thereof.

(b) One-stroke mark: A handwriting located proximate to the retrieved handwriting is also displayed. However, the retrieved handwriting itself and a handwriting located proximate to and above the retrieved handwriting are highlighted by changing the colors thereof.

(c) Enclosure: A handwriting located proximate to the retrieved handwriting is also displayed. However, retrieved handwriting itself and a handwriting contained inside the retrieved handwriting are highlighted by changing the colors thereof.

Figure 11:
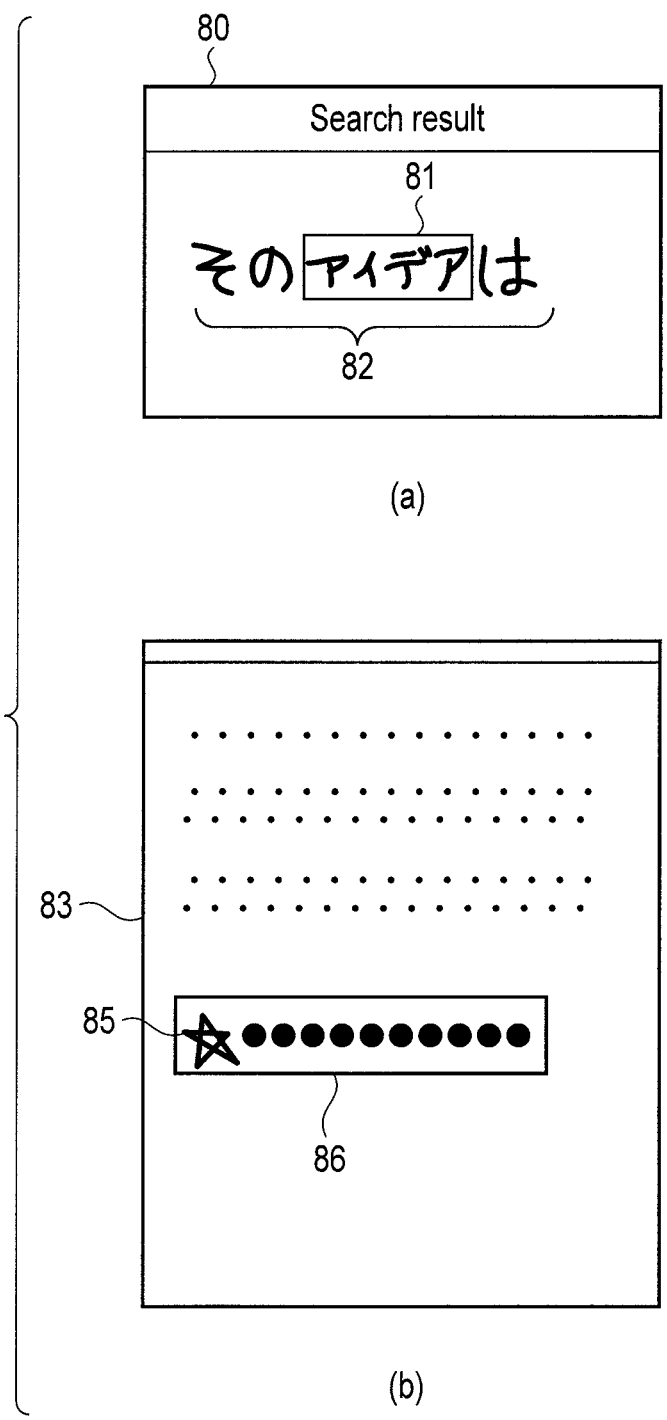
FIG. 11 is a diagram showing an example of display of a search result.

FIG. 11 shows an example of display of the search result. FIG. 11(a) shows an example in which a search result 82 including a retrieved handwriting (string) 81 and a proximate handwriting is displayed on a window 80 that shows the search result. FIG. 11(b) shows an example in which one line of handwriting 86 included in a page 83 containing the retrieved handwriting is displayed, the line of handwriting 86 including a one-stroke mark 85 and a handwriting succeeding the one-stroke mark 85.

The above-described embodiment can determine the type of the handwriting query, carry out a search by a search method corresponding to the type of the handwriting query, and display the search result by the corresponding appropriate display method. Thus, the appropriate search can be carried out by the search method corresponding to the type of the query.

Variations of the present embodiment will be described.

The searcher 3 according to the present embodiment may search for a group of handwritten documents accumulated in the handwritten document DB 4 inside the document search apparatus. Alternatively, if the document search apparatus can be connected to a network such as an intranet and/or the Internet, the searcher 3 may search for a group of handwritten documents accessible to the document search apparatus via the network. Alternatively, the searcher may search for a group of handwritten documents accumulated in a removable memory connected to the document search apparatus. Alternatively, the above-described methods may be optionally combined together.

The document search apparatus according to the present embodiment can be configured as a standalone apparatus or as a plurality of nodes that can communicate with one another via the network.

Furthermore, the document search apparatus according to the present embodiment can be implemented by various devices such as a general-purpose desktop or laptop computer, a portable general-purpose computer, any other portable information equipment, information equipment with a touch panel, a smart phone, and any other information processing apparatus.

Figure 12:
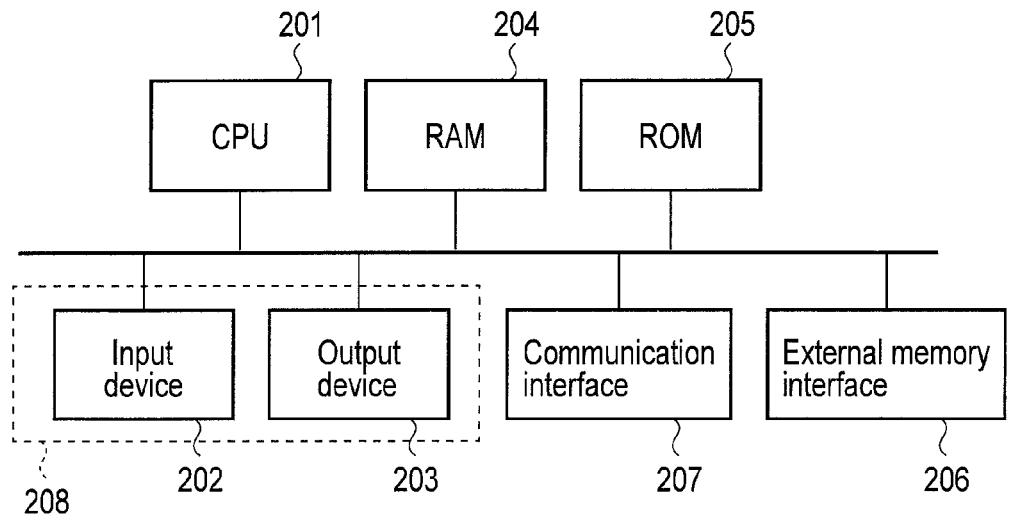
FIG. 12 is a diagram of a hardware configuration of the document search apparatus according to the embodiment.

FIG. 12 shows an example of configuration of hardware that implements the document search apparatus according to the present embodiment. In FIG. 12, CPU is denoted by 201, a predetermined input device is denoted by 202, and a predetermined output device is denoted by 203. A RAM is denoted by 204, a ROM is denoted by 205, an external memory interface is denoted by 206, and a communication interface is denoted by 207. For example, if a touch panel is used, for example, a liquid crystal panel, a pen, and a stroke detection apparatus provided on the liquid crystal panel are utilized (see 208 in FIG. 12).

Furthermore, for example, a part of the configuration in FIG. 1 may be provided on a client, with the remaining part of the configuration in FIG. 1 provided on a server.

Figure 13:
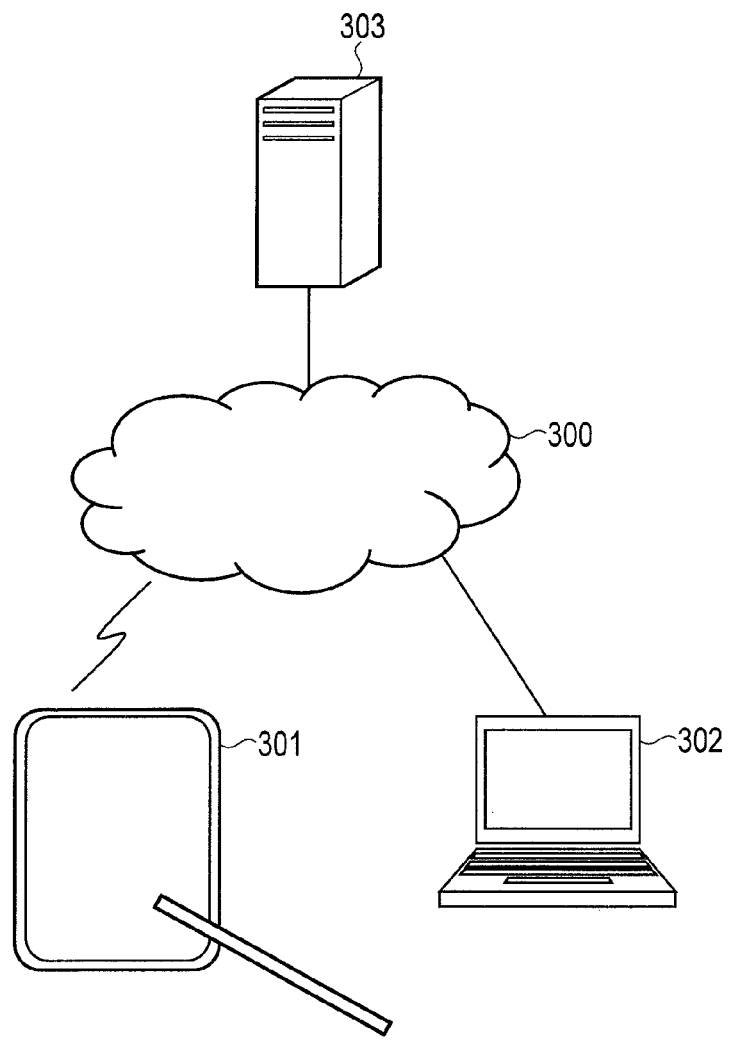
FIG. 13 is a diagram showing an example of a system that allows handwritten text data to be shared via a network.

For example, FIG. 13 illustrates that the document search apparatus according to the present embodiment is implemented in such a manner that a server 303 present on a network 300 such as an intranet and/or the Internet communicates with each client 301, 302 via the network 300.

In the illustrated case, the client 301 is connected to the network 300 via radio communication, and the client 302 is connected to the network 300 via wired communication.

The clients 301 and 302 are normally user apparatuses. The server 303 may be, for example, provided on a LAN such as a corporate LAN or operated by an Internet service provider or the like. Alternatively, the server 303 may be a user apparatus, and a certain user may provide functions to other users.

Various methods are possible for distributing the components in FIG. 1 into a client and a server.

Furthermore, the instructions shown in the process procedure in the above-described embodiment can be carried out based on a program that is software. When a general-purpose computer system pre-stores this program, reading in the program enables effects similar to those of the document search apparatus according to the above-described embodiment to be exerted. The instructions described above in the embodiment are recorded in a magnetic disk (a flexible disk, a hard disk, or the like), an optical disk (CD-ROM, CD-R, CD-RW, DVD-ROM, DVD±R, DVD±RW, or the like), a semiconductor memory, or a similar recording medium. The recording medium may have any storage form provided that a computer or a built-in system can read the instructions from the recording medium. The computer can perform operations similar to the operations of the document search apparatus described above in the embodiment by reading in the program from the recording medium and allowing a CPU to carry out the instructions described in the program based on the program. Of course, upon acquiring or reading in the program, the computer may acquire or read in the program through the network.

Furthermore, an OS (Operating System) operating on the computer or an MW (Middle Ware) such as a database management software or a network may carry out a part of the processing for implementing the present embodiment, based on the instructions obtained from the recording medium and installed in the computer or built-in system.

Moreover, examples of the recording medium according to the present embodiment are not limited to those which are independent of the computer or built-in system but include those in which a program transmitted and downloaded via a LAN, the Internet, or the like is stored or temporarily stored.

In addition, the number of recording media is not limited to one, but the present embodiment allows the processing according to the present embodiment to be carried out via a plurality of media. The recording medium may be configured in any manner.

The computer or built-in system according to the present embodiment carries out the processes according to the present embodiment based on the program stored in the recording medium. The computer or built-in system according to the present embodiment may have any configuration such as an apparatus comprising a single personal computer, a single microcomputer, or the like, or a system comprising a plurality of apparatuses connected together via the network.

Furthermore, the computer according to the present embodiment is not limited to a personal computer but may be an arithmetic processing apparatus, a microcomputer, or the like included in information processing equipment. The computer according to the present embodiment collectively refers to equipment and apparatuses which can execute the functions according to the present embodiment in accordance with the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document search apparatus comprising a hardware processor and a memory, the document search apparatus configured to:
   acquire data on a handwriting including coordinate data;
   determine a shape of the handwriting based on the coordinate data to determine a type of a query, the type of the query corresponding to one of direct handwriting, direct handwriting selection, and indirect handwriting selection;
   search the document according to a search method corresponding to the type of the query; and
   display the document by a display method corresponding to the type of the query,
   wherein when the shape is determined to be a line, the hardware processor is configured to determine a direction of the line and a distance between the line and a target handwriting in the document, in addition to the shape of the handwriting based on the coordinate data in time series of handwriting data, and to determine the line to be either a query input or a handwriting that is not a query depending on the direction and the distance.

2. The apparatus according to claim 1,
   wherein types of the query include a string, a one-stroke mark, an underline, and an enclosure.

3. The apparatus according to claim 2, wherein if the type of the query is the string, the document is searched for a handwriting similar to the handwriting with the data,
   if the type of the query is a one-stroke mark, the document is searched preferentially for a handwriting which is similar to the handwriting with the data acquired and which is located at a head of a line, if the type of the query is an underline, the document is searched for a horizontal line above and adjacent to which the handwriting with the data acquired is located, if the type of the query is an enclosure, the document is searched for a closed curve containing the handwriting with the data acquired.

4. A document search method performed by a hardware processor, the method comprising:

acquiring data on a handwriting including coordinate data;

determining a shape of the handwriting based on the coordinate data to determine a type of a query, the type of the query corresponding to one of direct handwriting, direct handwriting selection, and indirect handwriting selection;

searching the document according to a search method corresponding to the type of the query; and displaying the document by a display method corresponding to the type of the query, wherein when the shape is determined to be a line, the determining includes determining a direction of the line and a distance between the line and a target handwriting in the document, in addition to the shape of the handwriting based on the coordinate data in time series of handwriting data, and determining the line to be either a query input or a handwriting that is not a query depending on the direction and the distance.

5. The method according to claim 4, wherein types of the query include a string, a one-stroke mark, an underline, and an enclosure.

6. The method according to claim 5, wherein if the type of the query is the string, the document is searched for a handwriting similar to the handwriting with the acquired data, if the type of the query is a one-stroke mark, the document is searched preferentially for a handwriting which is similar to the handwriting with the acquired data and which is located at a head of a line, if the type of the query is an underline, the document is searched for a horizontal line above and adjacent to which the handwriting with the acquired data, if the type of the query is an enclosure, the document is searched for a closed curve containing the handwriting with the acquired data.

7. A non-transitory computer readable medium comprising instructions executable by a computer to cause the computer to function as:

an acquirer that acquires data on a handwriting including coordinate data;

a determiner that determines a shape of the handwriting based on the coordinate data to determine a type of a query, the type of the query corresponding to one of direct handwriting, direct handwriting selection, and indirect handwriting selection;

a searcher that searches the document according to a search method corresponding to the type of the query; and a display that displays the document by a display method corresponding to the type of the query, wherein when the shape is determined to be a line, the determiner determines a direction of the line and a distance between the line and a target handwriting in the document, in addition to the shape of the handwriting based on the coordinate data in time series of handwriting data, and determines the line to be either a query input or a handwriting that is not a query depending on the direction and the distance.

8. The medium according to claim 7, wherein types of the query include a string, a one-stroke mark, an underline, and an enclosure.

9. A document search apparatus comprising a hardware processor and a memory, the document search apparatus configured to:

acquire data on a handwriting including coordinate data;

determine handwriting based on the coordinate data to determine a type of a query, the type of the query corresponding to one of direct handwriting, direct handwriting selection, and indirect handwriting selection;

search the document according to a search method corresponding to the type of the query; and display the document by a display method corresponding to the type of the query, wherein when the handwriting is determined to be a line, the hardware processor is configured to determine a direction of the line and a distance between the line and a target handwriting in the document, in addition to the handwriting based on the coordinate data in time series of handwriting data, and to determine the line to be either a query input or a handwriting that is not a query depending on the direction and the distance.

10. A document search method performed by a hardware processor, the method comprising:

acquiring data on a handwriting including coordinate data;

determining handwriting based on the coordinate data to determine a type of a query, the type of the query corresponding to one of direct handwriting, direct handwriting selection, and indirect handwriting selection;

searching the document according to a search method corresponding to the type of the query; and displaying the document by a display method corresponding to the type of the query, wherein when the handwriting is determined to be a line, the determining includes determining a direction of the line and a distance between the line and a target handwriting in the document, in addition to the handwriting based on the coordinate data in time series of handwriting data, and determining the line to be either a query input or a handwriting that is not a query depending on the direction and the distance.

11. A non-transitory computer readable medium comprising instructions executable by a computer to cause the computer to function as:

an acquirer that acquires data on a handwriting including coordinate data;

a determiner that determines handwriting based on the coordinate data to determine a type of a query, the type of the query corresponding to one of direct handwriting, direct handwriting selection, and indirect handwriting selection;

a searcher that searches the document according to a search method corresponding to the type of the query; and a display that displays the document by a display method corresponding to the type of the query, wherein when the handwriting is determined to be a line, the determiner determines a direction of the line and a distance between the line and a target handwriting in the document, in addition to the handwriting based on the coordinate data in time series of handwriting data, and determines the line to be either a query input or a handwriting that is not a query depending on the direction and the distance.

* * * * *